June 4, 1968  S. R. WILCOX  3,387,075

METHOD FOR THE MANUFACTURE OF DOMESTIC STRAINERS

Filed May 19, 1965

United States Patent Office 3,387,075
Patented June 4, 1968

3,387,075
METHOD FOR THE MANUFACTURE OF DOMESTIC STRAINERS
Stanley Robert Wilcox, 197 Bay Road, Sandringham, Victoria, Australia
Filed May 19, 1965, Ser. No. 456,991
Claims priority, application Australia, May 25, 1964, 44,909/64
4 Claims. (Cl. 264—263)

ABSTRACT OF THE DISCLOSURE

A method of making a domestic strainer having a cup-shaped wire straining element attached to a plastic handle in which a lip on the straining element is sandwiched between ring elements composed of plastic material having a melting point no higher than the melting point of the plastic material before the handle is moulded onto the straining element in a die.

---

Figure 1:
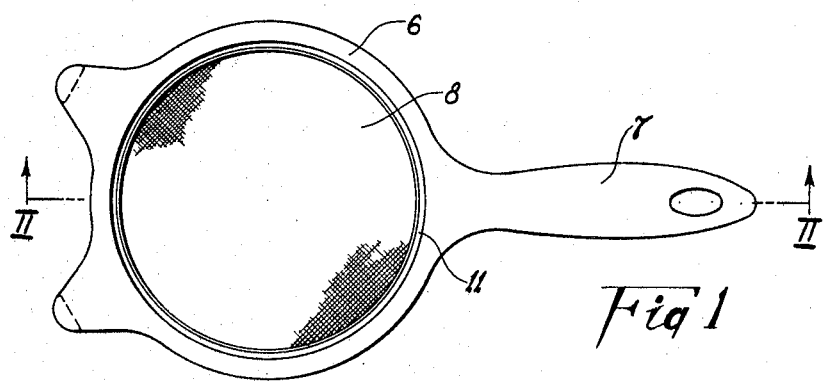

The present invention relates to an improved method for the manufacture of domestic strainers such as tea and coffee strainers and strainers for straining vegetable and fruit juices, cooked vegetables and fruits, milk and other liquids.

At the present time domestic strainers of the kind indicated include a frame composed of a resilient plastic material such as polypropylene or polythene having a cup-shaped straining element composed of wire gauze attached thereto. These strainers are produced by an injection moulding process using a die which conforms to the required shape of the frame. The straining element is provided with an outwardly extending lip around its periphery and to attach the straining element to the frame the lip is inserted between the die faces. When the molten plastic material is injected into the die, the die is operated to compress the plastic material around the lip and secure the straining element to the frame.

The foregoing method, while usually suitable for producing small domestic strainers such as tea strainers having straining elements including wire gauze composed of relatively fine wire, is not suitable for larger strainers such as colanders, having straining elements including wire gauze composed of relatively large gauge wire. This is due to the fact that, with straining elements including the relatively large gauge wire, the plastic material will leak out of the die between adjacent wires of the lip and flow onto the cup-shaped portion of the straining element and block the interstices therein. This is not so likely to happen with straining elements including fine wire gauze since the wires of the gauze are sufficiently small to permit the plastic material to be forced into sealing sengagement with the lip on the straining element.

The present invention has for its primary object to improve the foregoing method so that it will be suitable for producing domestic strainers irrespective of whether they include straining elements having fine wire gauze or large wire gauze.

According to the invention a method for the manufacture of a domestic strainer of the kind including a frame composed of a resilient plastic material having a cup-shaped straining element composed of wire gauze attached thereto, the frame being formed from molten plastic material in an injection moulding process using a die conforming to the required shape of the frame and the straining element being attached to the frame by an outwardly extending lip formed around the periphery of the straining element, comprises the steps of sandwiching a lip on a straining element between ring elements composed of a resilient plastic material having a melting or fusion point the same as or lower than the plastic material to be used for the frame, inserting the sandwiched lip into the space between open die elements of a die, flowing molten plastic material into the space between the open die elements, and then operating the die to compress the molten plastic material to form the frame and fuse the molten plastic material onto the ring elements so that the ring elements will form a seal between the molten plastic material and the cup-shaped portion of the straining element.

In order that the invention may be readily understood reference is made to the accompanying drawings in which—

Figure 2:
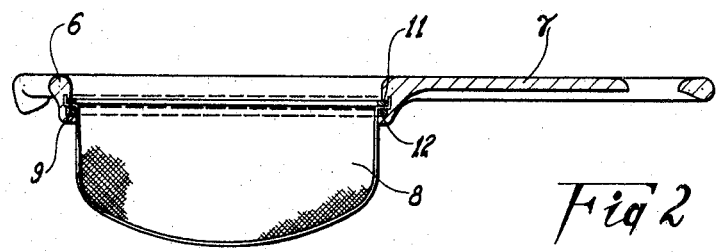
Figure 3:
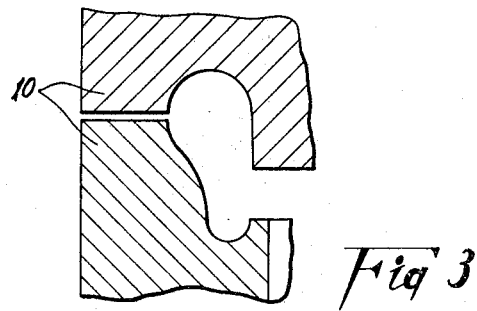
Figure 4:
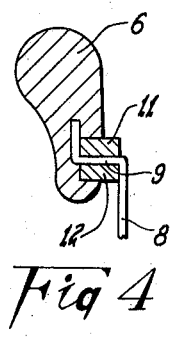

FIGURE 1 is a plan view of a strainer produced in accordance with the method of the invention, FIGURE 2 is a longitudinal sectional view taken along the line II—II of FIGURE 1, FIGURE 3 is detail in cross section of a portion of a die suitable for use in the method of the invention, and FIGURE 4 is enlarged detail view of portion of the cross sectional view of FIGURE 2.

Referring to the drawings FIGURE 1 and FIGURE 2 illustrate a strainer having a substantially circular frame 6 composed of resilient plastic material such as polypropylene or polythene and provided with a handle 7. The frame 6 supports a cup-shaped straining element 8 composed of wire gauze. The straining element 8 is provided with an outwardly extending lip or edge 9 formed around its periphery to permit it to be attached to the frame 8 by an injection moulding process using a die conforming to the required shape of the frame. FIGURE 3 illustrates a portion of a suitably shaped die 10.

According to the invention the lip 9 is sandwiched between ring elements 11 and 12 composed of a resilient plastic material such as polypropylene or polythene having a melting or fusion point the same as or lower than the plastic material to be used for the frame. The sandwiched lip 9 is inserted into the space between the open die elements of the die 10, the molten plastic material for the frame is flowed into the space between the open die elements and then the die 10 is operated to compress the molten plastic material to form the frame and fuse the molten plastic material onto the ring elements 11 and 12.

The ring elements 11 and 12 will form a seal between the molten plastic material and the cup-shaped portion of the straining element and therefore will prevent the molten plastic material from leaking out of the die onto the cup-shaped portion of the straining element 8 and blocking the interstices in the straining element 8.

Having now described my invention, what I claim as new and desire to secure by Letters Patent is:

1. A method for the manufacture of a domestic strainer of the kind including a frame composed of a resilient plastic material having a cup-shaped straining element composed of wire gauze attached thereto, the frame being formed from molten plastic material in an injection moulding process using a die conforming to the required shape of the frame and the straining element being attached to the frame by an outwardly extending lip formed around the periphery of the straining element; the method comprising the steps of sandwiching a lip on a straining element between ring elements composed of a resilient plastic material having a melting point no higher than the plastic material to be used for the frame, inserting the sandwiched lip into the space between open die elements of a die, flowing molten plastic material into the space between the open die elements, and then operating the die to compress the molten plastic material to form the frame and fuse the molten plastic material onto the ring elements so that the ring elements will form a seal between the molten plastic material and the cup-shaped portion of the straining element.

2. A method as claimed in claim 1 wherein said lip is bent to form a flat portion interposed between the ring elements and a terminal edge portion which is perpendicular to the flat portion and projects beyond the ring elements to be directly moulded into the molten plastic material introduced into the die.

3. A method as claimed in claim 2 wherein said lip includes a first portion sandwiched between the ring elements and a terminal edge portion extending perpendicularly from said first portion and beyond the ring elements to be embedded in the plastic material of the frame.

4. A method as claimed in claim 3 wherein said first portion of the lip extends perpendicular to the main body of the cup-shaped straining element.

References Cited

UNITED STATES PATENTS

| | | | |
|---|---|---|---|
| 3,124,630 | 3/1964 | Ronning et al. | 264—276 |
| 3,142,081 | 7/1964 | Hartz et al. | 15—179 |

FOREIGN PATENTS

| | | |
|---|---|---|
| 1,355,610 | 2/1964 | France. |

ROBERT F. WHITE, *Primary Examiner.*

J. R. HALL, *Assistant Examiner.*